United States Patent
Stephens

(10) Patent No.: US 11,128,771 B2
(45) Date of Patent: Sep. 21, 2021

(54) PORTABLE SCANNER ASSEMBLY

(71) Applicant: Eugene Stephens, Ann Arbor, MI (US)

(72) Inventor: Eugene Stephens, Ann Arbor, MI (US)

(*) Notice: Subject to any disclaimer, the term of this patent is extended or adjusted under 35 U.S.C. 154(b) by 22 days.

(21) Appl. No.: 16/787,378

(22) Filed: Feb. 11, 2020

(65) Prior Publication Data
US 2020/0259969 A1 Aug. 13, 2020

Related U.S. Application Data

(60) Provisional application No. 62/918,772, filed on Feb. 11, 2019.

(51) Int. Cl.
*H04N 1/04* (2006.01)
*H04N 1/00* (2006.01)

(52) U.S. Cl.
CPC ....... *H04N 1/00533* (2013.01); *H04N 1/0079* (2013.01); *H04N 1/00554* (2013.01); *H04N 1/00559* (2013.01); *H04N 2201/0096* (2013.01)

(58) Field of Classification Search
CPC ........... H04N 1/00533; H04N 1/00554; H04N 1/00559; H04N 1/0079; H04N 2201/0096; H04N 1/1013; H04N 1/1039
USPC .................. 358/473, 474, 497; 382/312, 313
See application file for complete search history.

(56) References Cited

U.S. PATENT DOCUMENTS

| | | | | |
|---|---|---|---|---|
| 4,728,803 A * | 3/1988 | Catchpole | ............ | H04N 1/0311 358/465 |
| 4,849,815 A * | 7/1989 | Streck | ................ | H04N 1/00206 379/100.02 |
| 5,251,072 A * | 10/1993 | Fukuoka | ............ | H04N 1/02409 359/896 |
| 6,271,939 B1 * | 8/2001 | Hu | ...................... | H04N 1/00538 358/473 |
| 6,721,072 B1 * | 4/2004 | Tsai | ...................... | H04N 1/1013 355/66 |
| 6,809,842 B1 * | 10/2004 | Tsai | ...................... | H04N 1/1013 250/208.1 |
| 7,522,318 B2 * | 4/2009 | Lee | ......................... | G03B 27/52 250/234 |
| 2001/0013890 A1 * | 8/2001 | Narayanaswami | .. | H04N 5/2251 348/14.01 |
| 2003/0147104 A1 * | 8/2003 | Tseng | ................... | H04N 1/1017 358/474 |
| 2014/0104660 A1 * | 4/2014 | Liu | ..................... | H04N 1/00559 358/497 |

(Continued)

*Primary Examiner* — Cheukfan Lee

(57) ABSTRACT

A scanner assembly for portably scanning documents is disclosed. The scanner assembly includes a board and a cradle assembly. The cradle assembly includes a first cradle member and second cradle member spaced from one another, coupled to the board, and configured to receive the scanner. The cradle assembly includes a support bracket disposed between and coupled to the first and second cradle members. The cradle assembly also includes a lock assembly coupled to the first cradle member and movable between a first position where the scanner is fixed to the first and second cradle members and a second position where the scanner is removable from the first and second cradle members. The first and second cradle members and the support bracket of the cradle assembly are movable along the board for allowing the scanner to scan documents disposed on the board.

20 Claims, 19 Drawing Sheets

(56) References Cited

U.S. PATENT DOCUMENTS

| | | | | |
|---|---|---|---|---|
| 2014/0293373 A1* | 10/2014 | Onishi | .................... | H04N 1/10 |
| | | | | 358/497 |
| 2015/0264215 A1* | 9/2015 | Takahashi | ............ | H04N 1/1008 |
| | | | | 358/474 |
| 2018/0075268 A1* | 3/2018 | Jun | .................... | G06K 7/10376 |

* cited by examiner

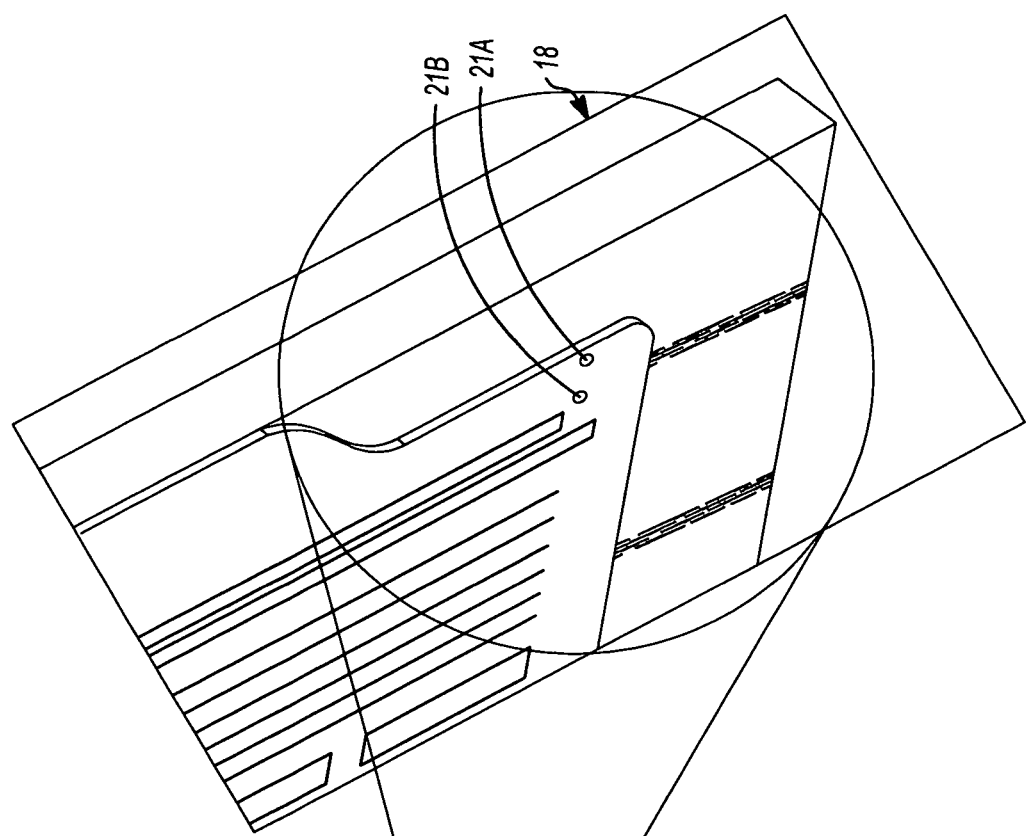
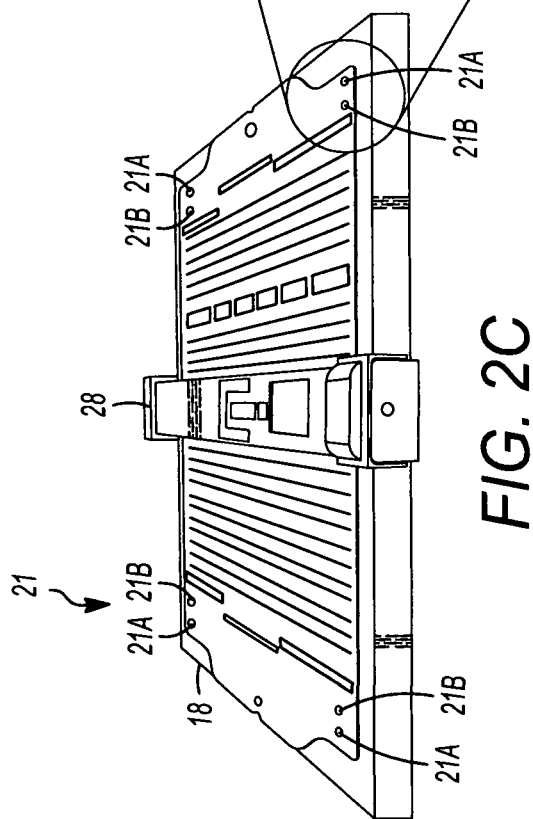
FIG. 2D
FIG. 2C

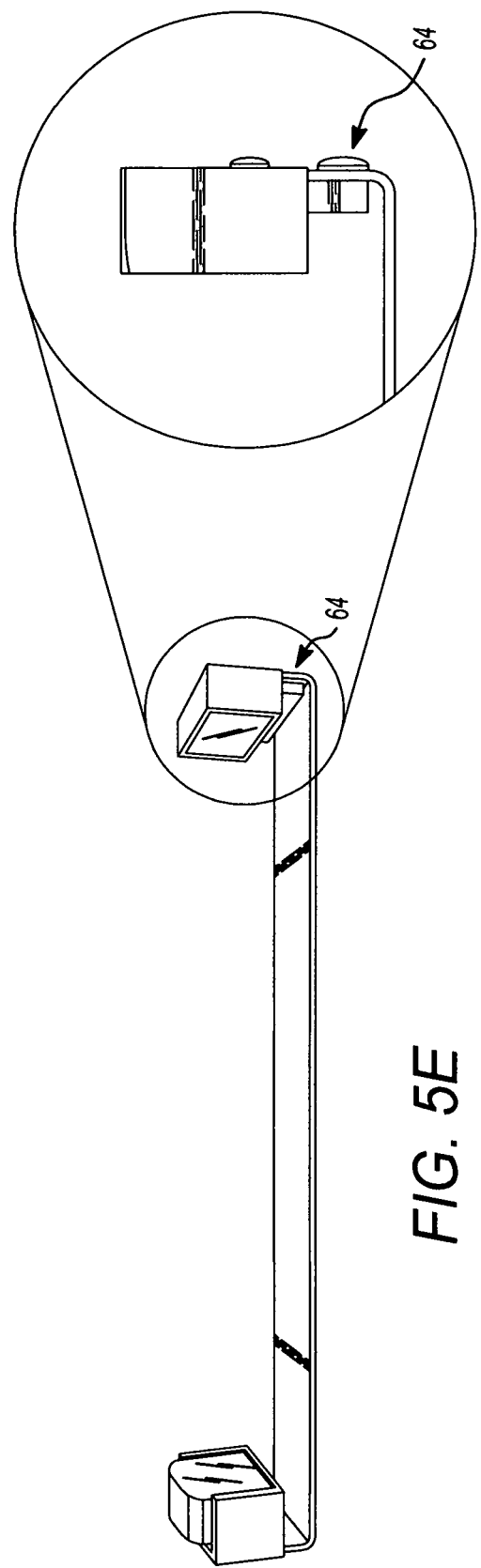

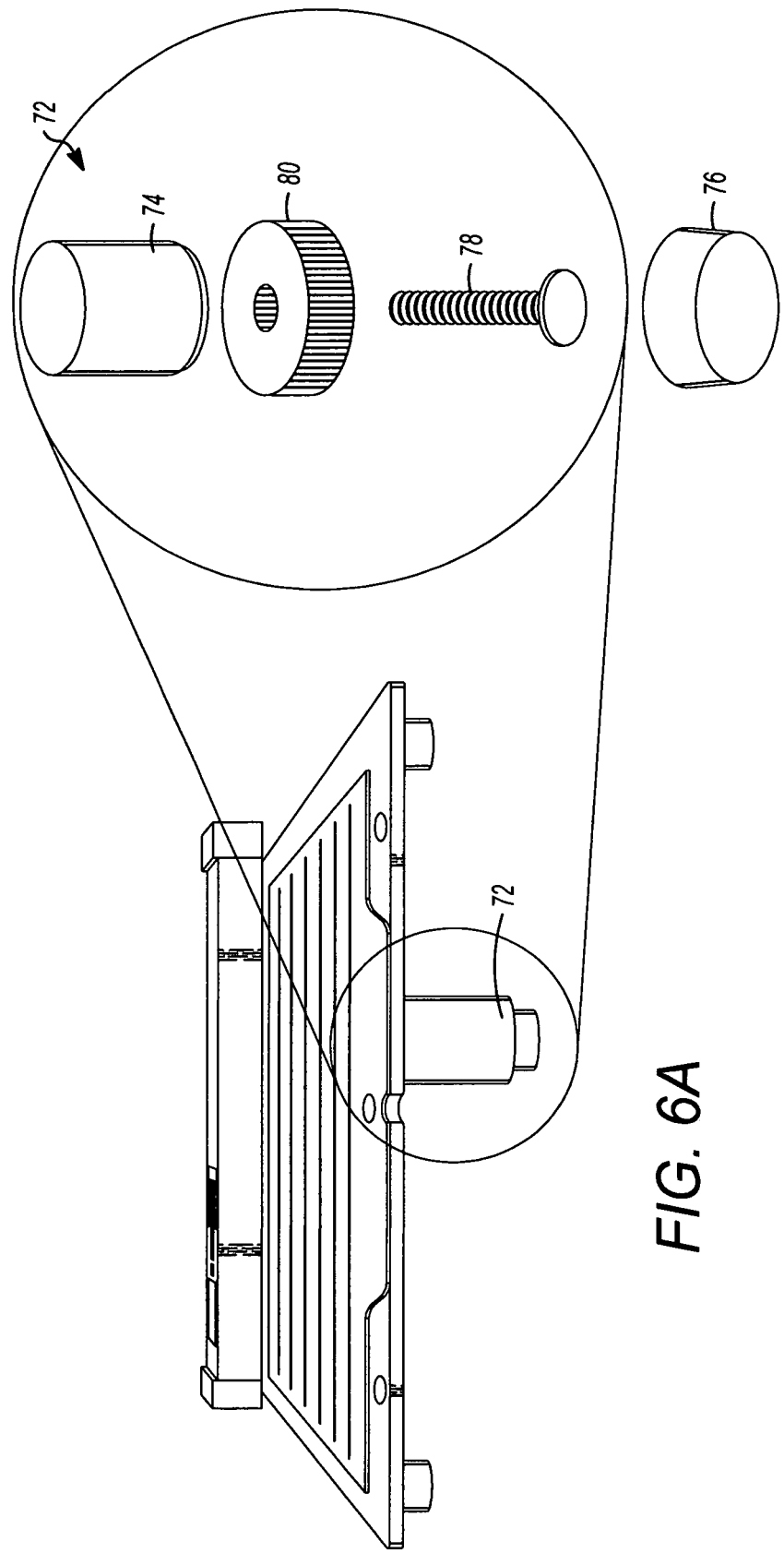

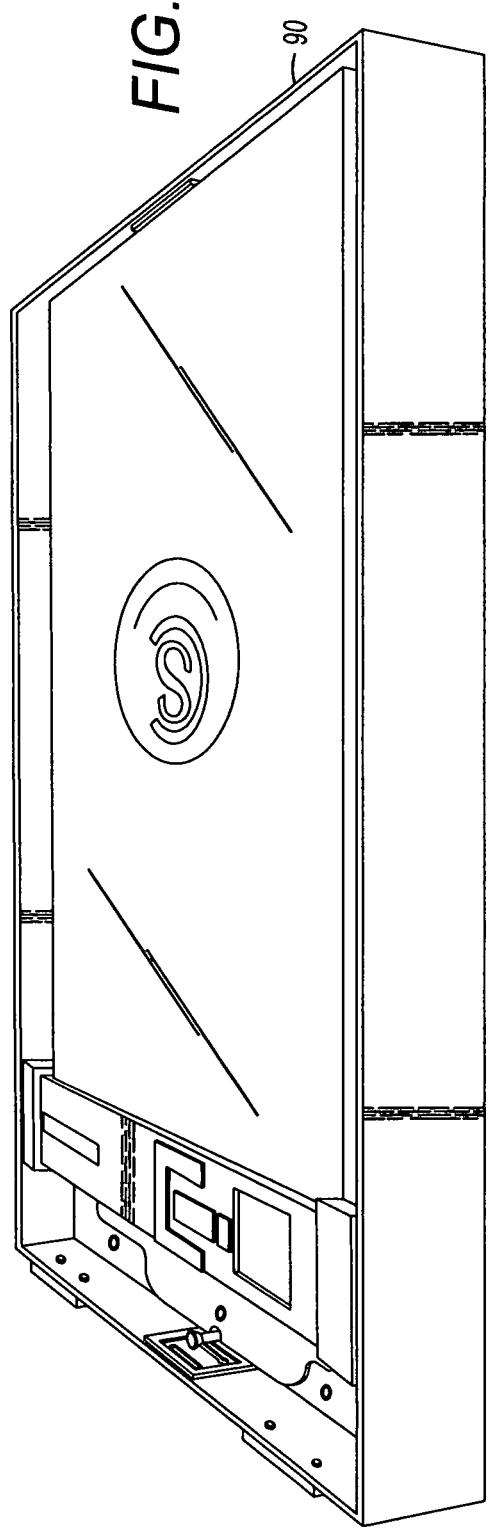
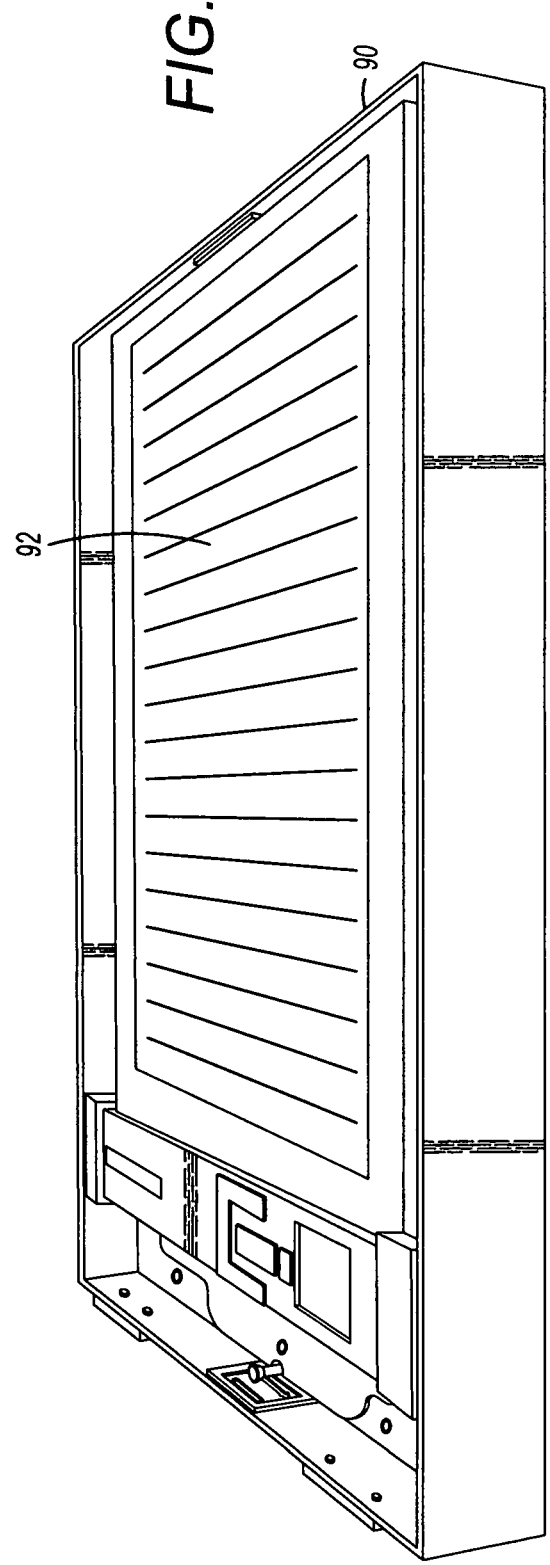
FIG. 10A
FIG. 10B

PORTABLE SCANNER ASSEMBLY

CROSS-REFERENCE TO RELATED APPLICATION

This application claims the benefit of and priority to provisional application No. 62/918,772, filed on Feb. 11, 2019, the disclosure of which is hereby incorporated in its entirety by reference herein.

TECHNICAL FIELD

The present disclosure is related generally to a system for scanning a document.

BACKGROUND

A scanner is a device that scans a document or image and converts them into digital data. Many businesses require associates or employees to send documents from one location to another. Industries that may use a portable scanner are medical, construction, real estate, trucking/logistics, attorneys, education, law enforcement, and others. This is usually accomplished by using a portable scanner or a scanning application on a smartphone. The quality is not always acceptable or consistent when using a smartphone. Results may vary when scanning with a smartphone depending on the skill set of the operator. Quality issues are poor light distribution, out of focus, keystone effect, and time consuming to create desired image size when using a smartphone to replace a scanner. Portable scanners are prone to paper jams and it is difficult to feed documents or receipts of different sizes, or document that are wrinkled. In addition, handheld portable scanners known in the art are not suited to linearly scan irregularly-shaped materials, such as bound book volumes.

As such, there are opportunities to address at least the aforementioned problems.

SUMMARY

A scanner assembly for portably scanning documents is disclosed. The scanner assembly includes a board and a cradle assembly. The board extends from a first end to a second end and has a first face and a second face opposite the first face. The cradle assembly includes a first cradle member coupled to the board and defining a pocket configured to receive a scanner and a second cradle member coupled to the board and spaced from the first cradle member, with the second cradle member being configured to receive the scanner. The cradle assembly includes a support bracket disposed between and coupled to the first and second cradle members. The cradle assembly also includes a lock assembly coupled to the first cradle member and movable between a first position where the scanner is fixed to the first and second cradle members and a second position where the scanner is removable from the first and second cradle members. The first and second cradle members and the support bracket of the cradle assembly are movable along the board between the first and second ends for allowing the scanner to scan documents on the first face of the board.

A scanner assembly for portably scanning documents is disclosed. The scanner assembly includes a board and a cradle assembly. The board extends from a first end to a second end and has a first face and a second face opposite the first face. The cradle assembly includes a first cradle member coupled to the board and defining a pocket configured to receive a scanner and a second cradle member coupled to the board and spaced from the first cradle member, with the second cradle member being configured to receive the scanner. The cradle assembly includes a support bracket disposed between and coupled to the first and second cradle members. The cradle assembly also includes a tension assembly coupled to the cradle assembly and configured to adjust tension between the cradle assembly and the board. The first and second cradle members and the support bracket of the cradle assembly are movable along the board between the first and second ends for allowing the scanner to scan documents on the first face of the board.

A scanner assembly for portably scanning documents is disclosed. The scanner assembly includes a case including a base defining an interior and a lid configured to couple to the base. The lid is movable between an open position where said lid is spaced from the base and a closed position where the lid is coupled to the base. The scanner assembly also includes a board disposable in the interior of the base and a cradle assembly. The board extends from a first end to a second end and has a first face and a second face opposite the first face. The cradle assembly includes a first cradle member coupled to the board and defining a pocket configured to receive a scanner and a second cradle member coupled to the board and spaced from the first cradle member, with the second cradle member being configured to receive the scanner. The cradle assembly includes a support bracket disposed between and coupled to the first and second cradle members. The first and second cradle members and the support bracket of the cradle assembly are movable along the board between the first and second ends for allowing the scanner to scan documents on the first face of the board.

BRIEF DESCRIPTION OF THE DRAWINGS

Other advantages of the present disclosure will be readily appreciated, as the same becomes better understood by reference to the following detailed description when considered in connection with the accompanying drawings wherein:

FIGS. 2C and 2D are perspective and zoomed views of registration marks of the scanner assembly.

FIGS. 5E, 5F, and 5G are perspective, zoomed, and exploded views of a tension assembly coupled to the cradle assembly.

FIGS. 6A and 6B are perspective and exploded views of an adjustable support of the scanner assembly.

FIGS. 10A and 10B are perspective views of an insert of the scanner assembly.

DETAILED DESCRIPTION

Figure 1A:
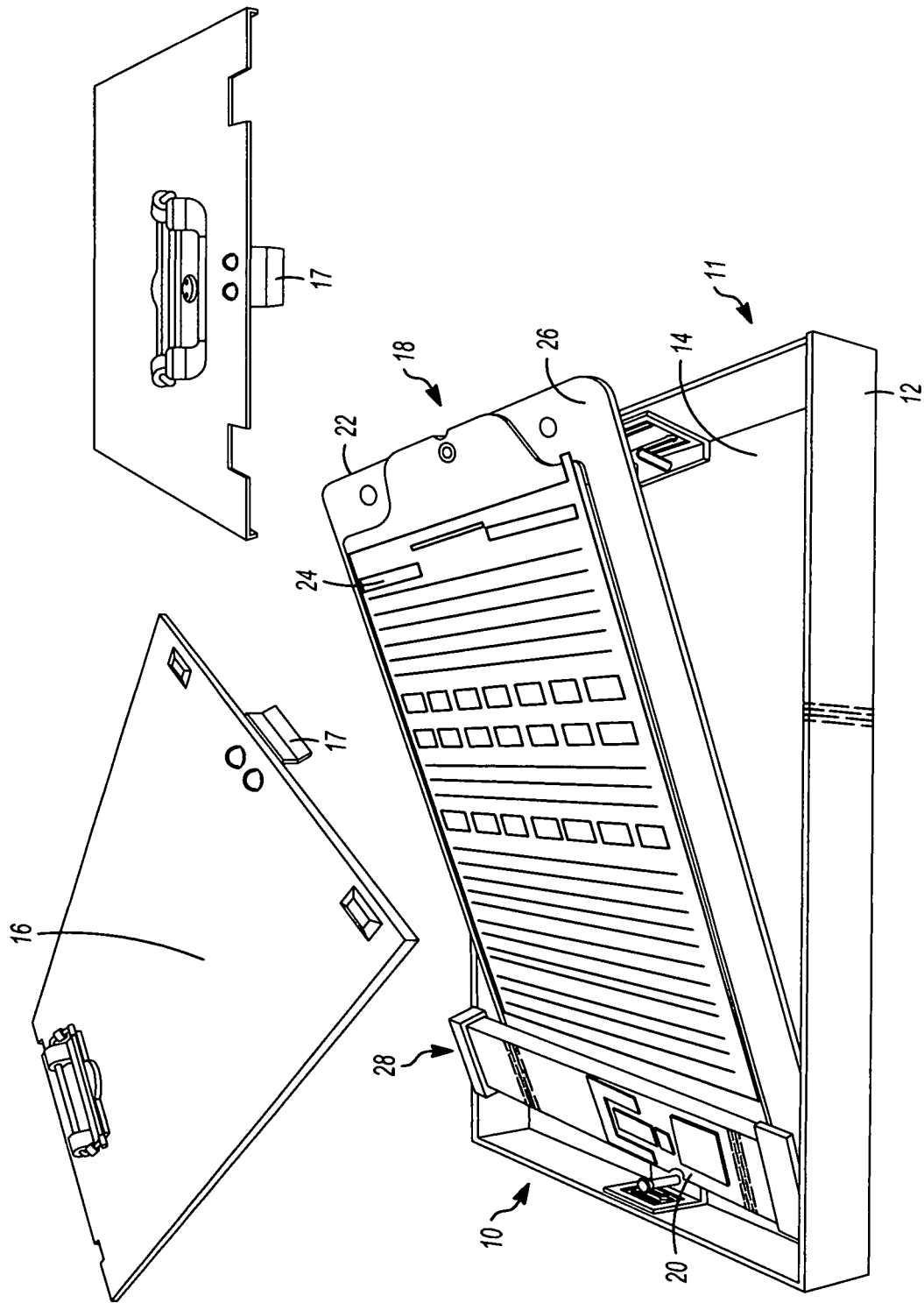
FIG. 1A is an exploded view of a scanner assembly.
Figure 1B:
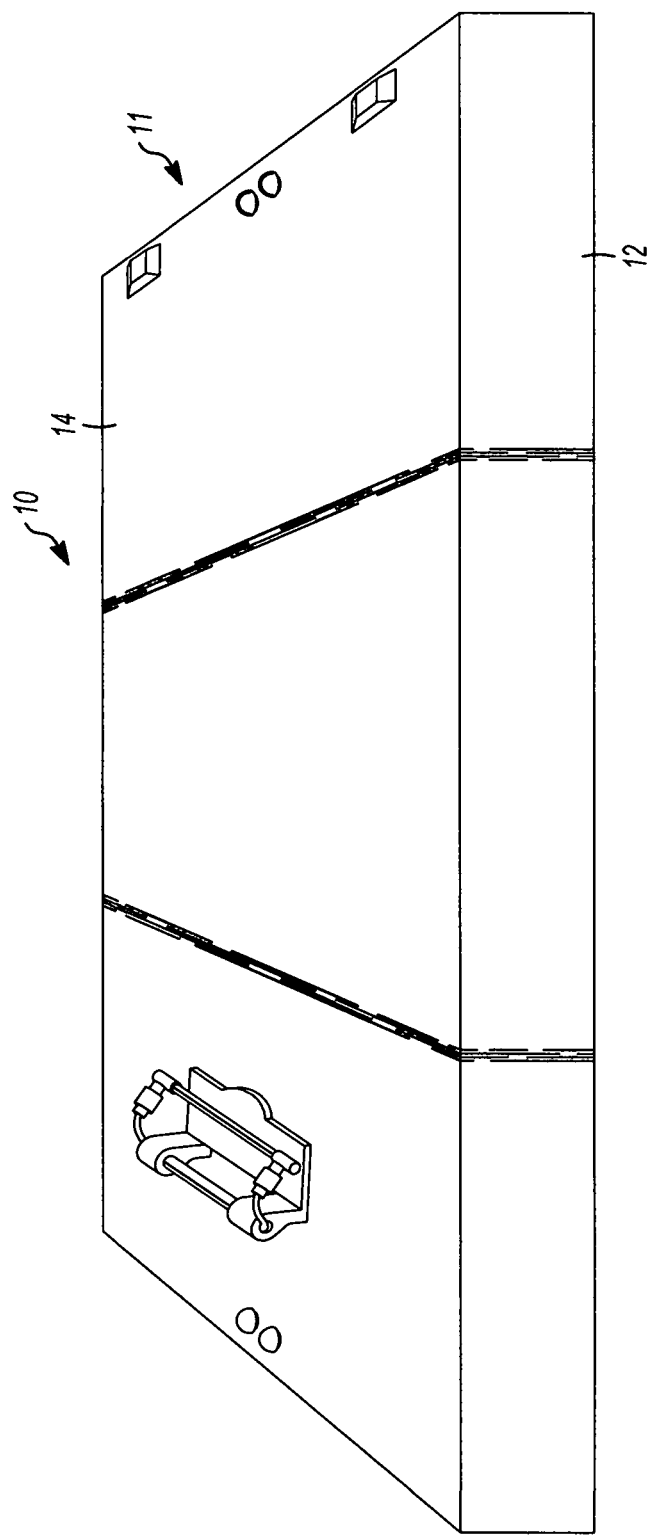
FIG. 1B is a perspective view of the scanner assembly.

An instance of a scanner assembly 10 for portably scanning documents is shown in FIG. 1A. As shown, the scanner assembly 10 may include case 11, which may include a base 12 that defines an interior 14. Also shown, the case 11 may include a lid 16 that couples to the base 12 and is movable between an open position and a closed position. In FIG. 1A, the lid 16 is shown in the open position in FIG. 1B where the lid 16 is spaced from the base 14. In FIG. 1B, the lid 14 is shown in the closed position where the lid 16 is coupled to the base 12. In FIG. 1A, the scanner assembly 10 includes spring clips 17 for attached the lid 16 to the base 12. In other instances, the scanner assembly 10 may include a clamp, latch, catch bolt, hinge, or any other suitable element for attaching the lid 16 to the base 12.

Also shown in FIG. 1A, the scanner assembly 10 may include a board 18 disposable in the interior 14 of the base 12. The board 18 extends from a first end 20 to a second end 22 and includes a first face 24 and a second face 26 opposite the first face 24.

Figure 1C:
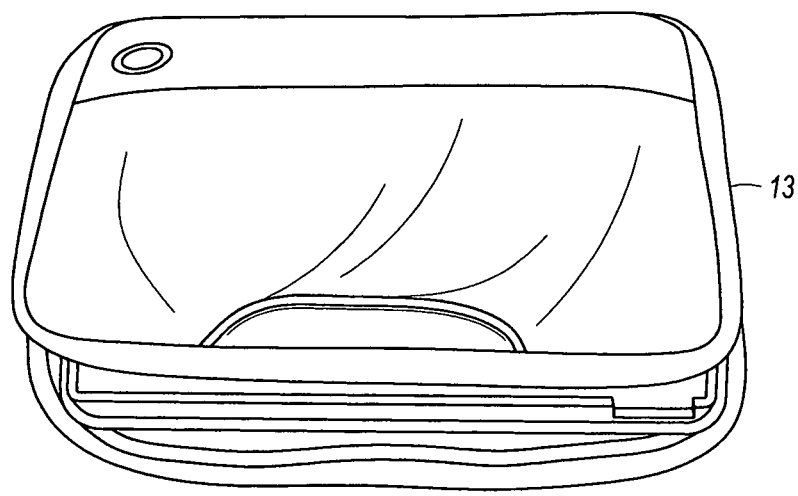
FIGS. 1C and 1D are perspective views of a scanner assembly including a case including a cloth material.
Figure 1D:
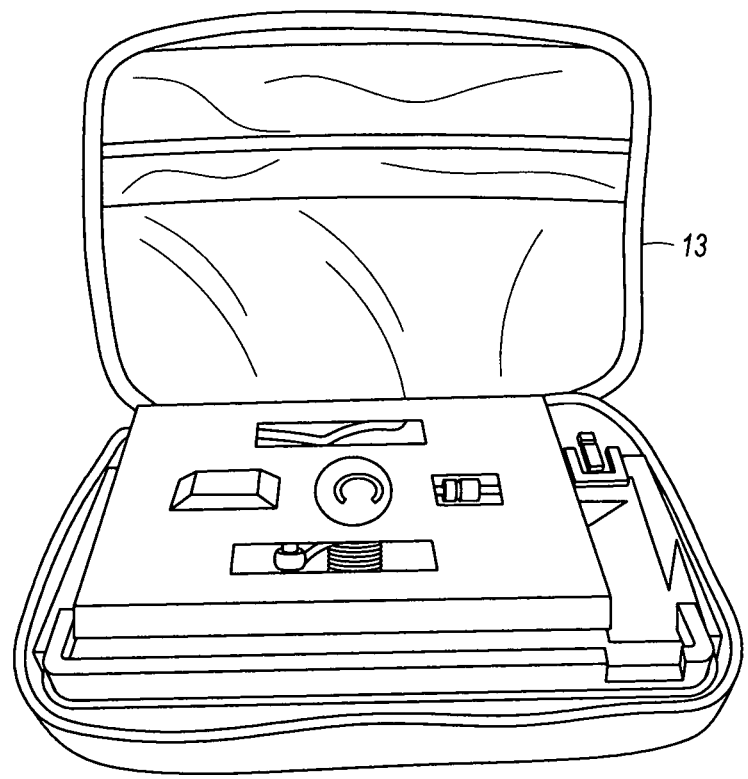

Components of the scanner assembly 10 described herein may include any suitable material. For example, the case 11 and the board 18 of the scanner assembly 10 may include a metallic, plastic, rubber, composite, and/or organic (e.g. wood, paper, etc.) material. Additionally, components of the scanner assembly 10 may include different materials. For example, the lid 16 may include a plastic material and the base 12 may include a type of wood. Furthermore, a material for a component of the scanner assembly 10 may be chosen based on a durability, a coefficient of friction, and/or weight of the material. In FIGS. 1C and 1D, the case 11 includes a cloth material. In addition, the scanner assembly may comprise a static-inducing materials, such as polyester, to reduce the movement of a document during scanning.

The scanner assembly 10 scans documents placed on the board 18. As such, the board 18 may be of any size suitable for scanning a variety of documents. For example, the board 18 may be of a size suitable for scanning Letter, Legal, Tabloid, A series, B series, and/or C series sized documents. Similarly, all other components of the scanner assembly 10 described herein may be of any size suitable for scanning a variety of documents. The scanner assembly may accept scanning units that may communicate to other devices by wireless network or other connection.

The scanner assembly 10 may also include a cradle assembly 28, which is configured to receive a scanner 30. The cradle assembly 28 is movable along the board 18 between the first end 20 and the second end 22 for allowing the scanner 30 to scan documents on the first face 24 of the board 18.

The board 18 may include a document holder 19 configured to retain documents for scanning. The document holder 19 also protects documents during scanning and allows for scanning of wrinkled documents. The document holder 19 includes a first end 19A and a second end 19B. In the instance of FIG. 2B, a user of the scanner assembly 10 lifts the second end 19B of the document holder 19 and places a document between the document holder 19 and the first face 24 of the board 18.

Figure 2A:
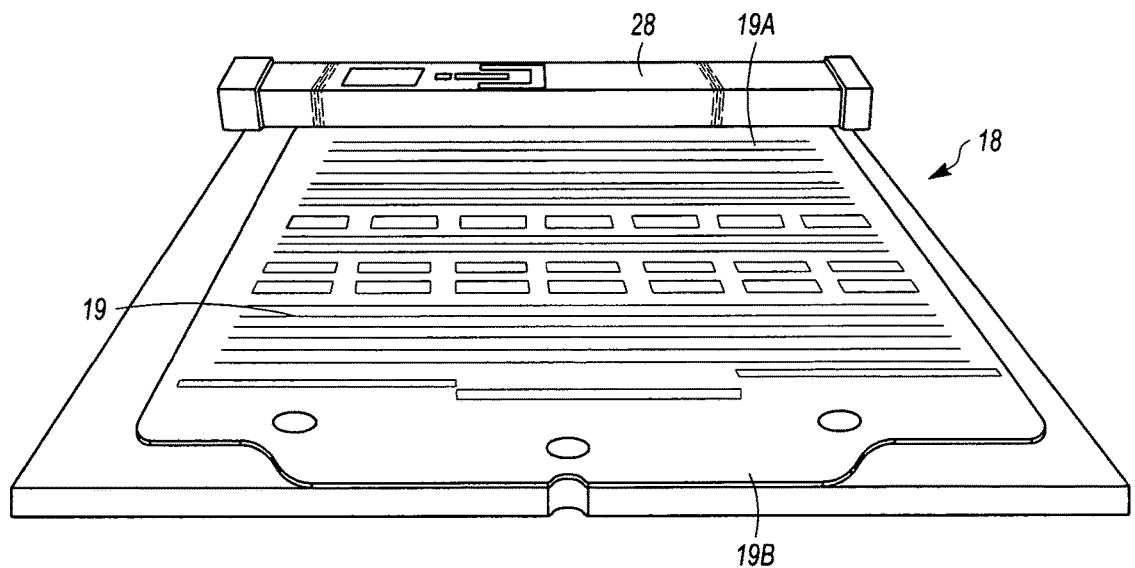
FIGS. 2A and 2B are perspective views of a document holder of the scanner assembly.
Figure 2B:
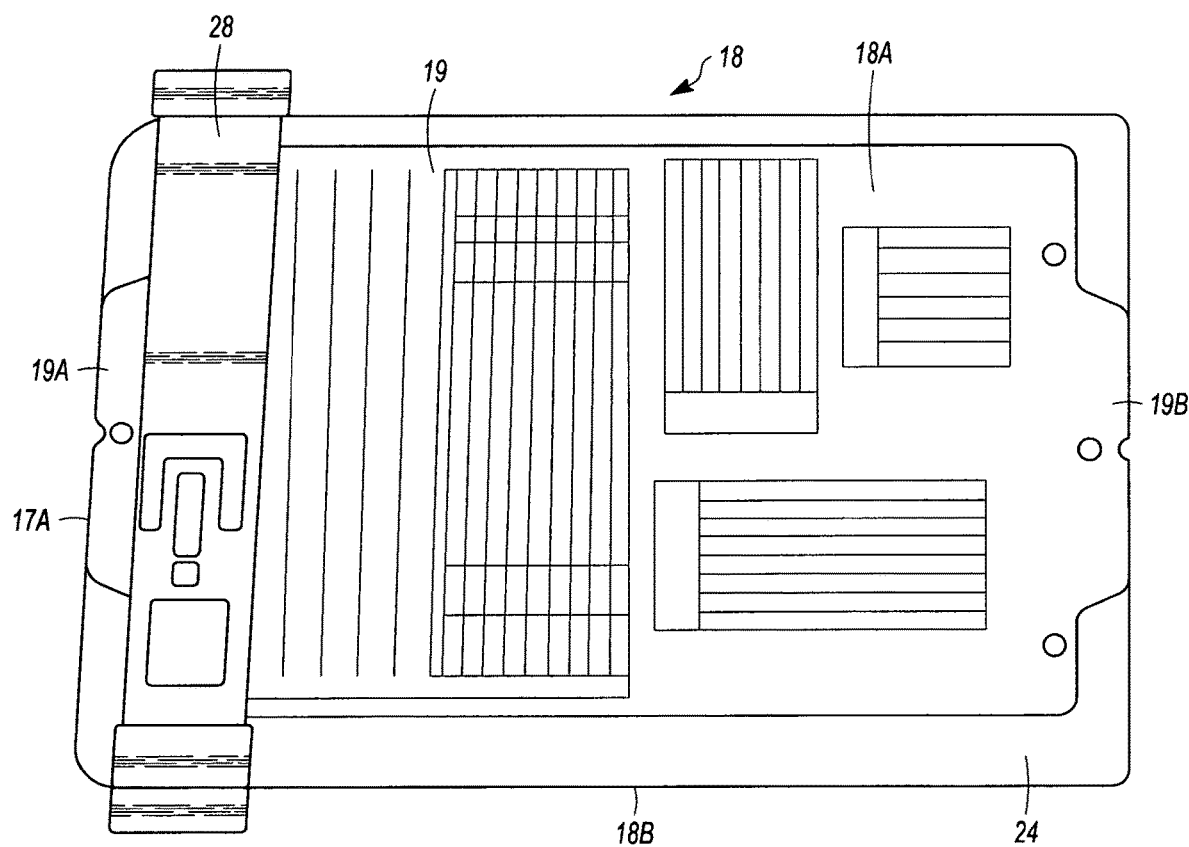

In the instance of FIGS. 2A and 2B, the first end 19A of the document holder 19 is coupled to the board 18. The first end 19A of the document holder 19 may be coupled to the board 18 using any suitable means. For example, the first end 19A of the document holder 19 may be coupled to the first face 24 of the board 18 using double-sided tape or glue. In instances where the board 18 includes two separate boards, such as the boards 18A, 18B shown in FIG. 2B, the first end 19A of the document holder 19 may be folded under one board such that the document holder 19 is coupled to the board 18 between the two separate boards.

In some instances, the second end 19B of the document holder 19 may be coupled to the board 18. In instances where the second end 19B of the document holder 19 is coupled to the board 18 and the first end 19A of the document holder 19 is not coupled to the board 18, a user of the scanner assembly 10 may lift the first end 19A of the document holder to place a document between the document holder 19 and the first face 24 of the board 18 for scanning. In instances where both the first end 19A and the second end 19B are coupled to the board 18, a user of the scanner assembly 10 may slide a document into the document holder 19 between the first and second ends 19A, 19B.

The document holder 19 may include any suitable transparent material. For example, the document holder 19 may include cellulose acetate, polyester, polyethylene, polyvinyl chloride, polypropylene, or any other suitable material. A material for the document holder 19 may be chosen based on a thickness, durability, a coefficient of friction, and/or a clarity of the material.

As shown in FIGS. 2C and 2D, the board 18 may include document registration marks 21. The document registration marks 21 allows a user of the scanner assembly 10 to properly place a document on the board 18 for scanning. For example, a user may place a document on the board 18 such that the document is aligned with or covers the corresponding registration mark 21. For example, in FIGS. 2C and 2D, the board 18 includes registration marks 21A, 21B, which indicate to a user of the scanner assembly 10 where to place documents of various sizes. For instance, registration marks 21A may indicate to a user where to place an A4-sized document and registration marks 21B may indicate to a user where to place a Letter-sized document.

Figure 3A:
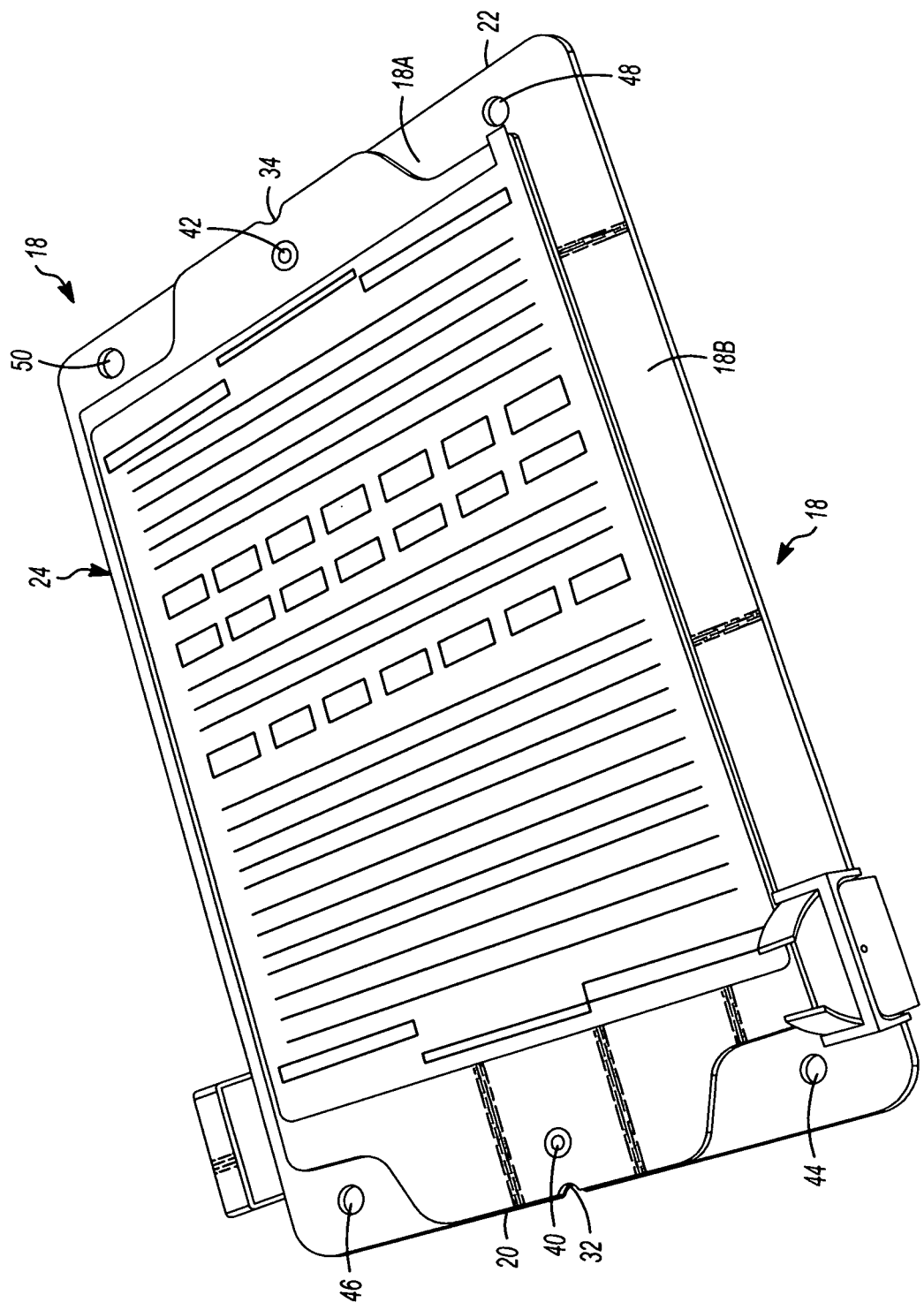
FIG. 3A is a perspective view of a board of the scanner assembly.
Figures 3B, 3C:
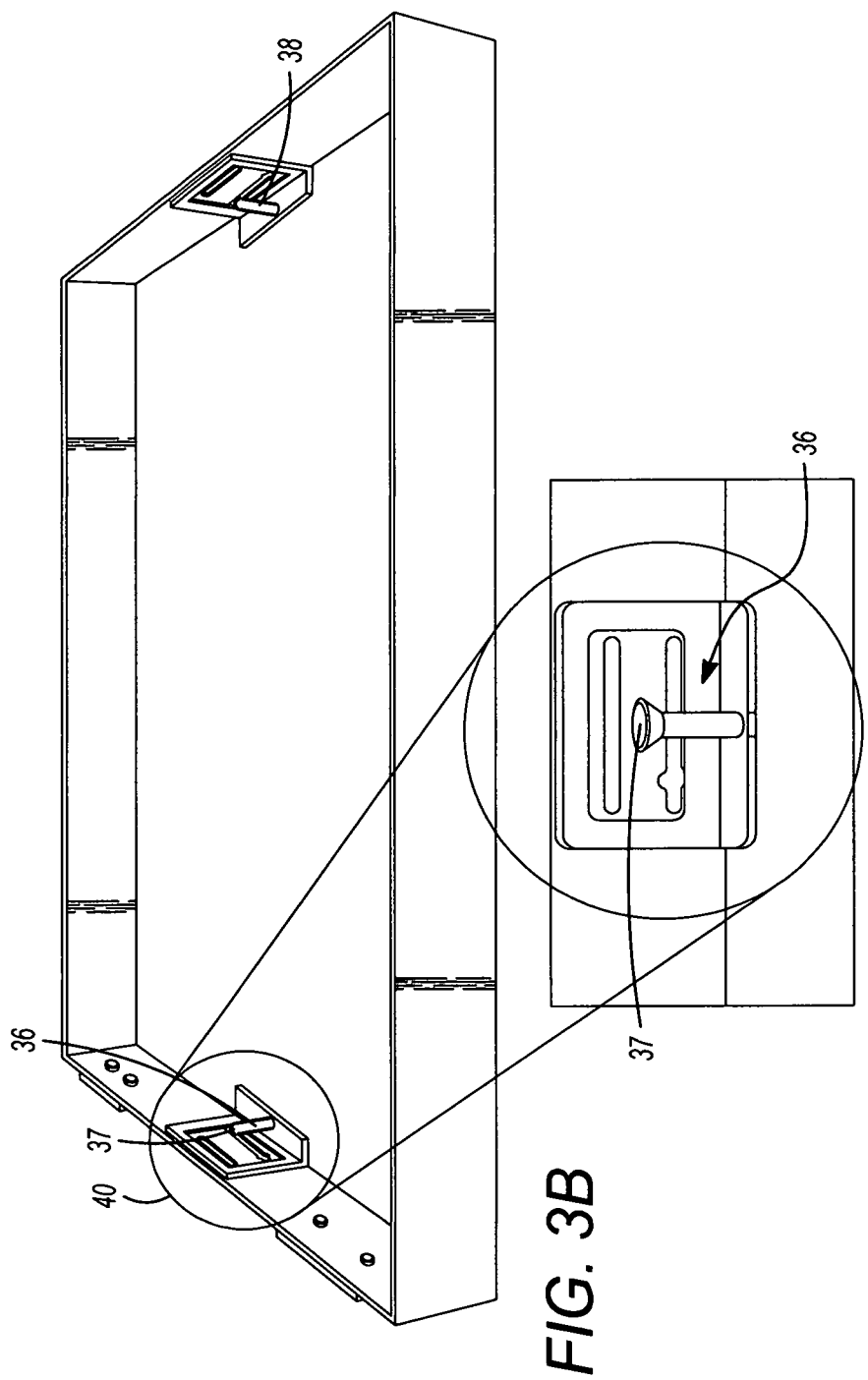
FIGS. 3B and 3C are perspective and zoomed views of a locating projection of the scanner assembly.

FIGS. 3A and 3B further illustrate how the board 18 is disposed in the case 11. As shown in FIG. 3A, the board 18 includes locating recesses 32, 34. As shown in FIG. 3B, the case 11 includes locating projections 36, 38. Specifically, in the instance of FIG. 3A, the base 12 of the case 11 includes the locating projections 36, 38. When the board 18 is disposed in the case 11, the locating recesses 32, 34 receive the locating projections 36, 38, respectively. As shown in FIG. 2C, the locating projection 36 includes a cap 37 that indicates to a user of the scanner assembly 10 where the first end 20 of the board 18 should be placed. In this way, the locating recesses 32, 34 and the locating projections 36, 38 ensure that the board 18 is properly and securely disposed within the case 11. It should be note that, in some instances, the board 18 may include a locating projection and the case 11 may include a locating recess. Additionally, in some instances, the lid 16 may include the locating projections 36, 38. Furthermore, in some instances, the cap 37 may be omitted.

In the instance of FIG. 3A, the board 18 includes a first board 18A and a second board 18B. The board 18 also includes a first securing pin 40 and a second securing pin 42 for securing the first board 18A to the second board 18B. In some instances, a color of the first securing pin 40 may correspond to a color of the cap 37 such that a user of the scanner assembly 10 correctly places the first end 20 of the board 18 adjacent the cap 37. It should be noted that, in instances where the board 18 does not include the first board 18A and the second board 18B, the board may omit the first and second securing pins 40, 42.

Figure 4A:
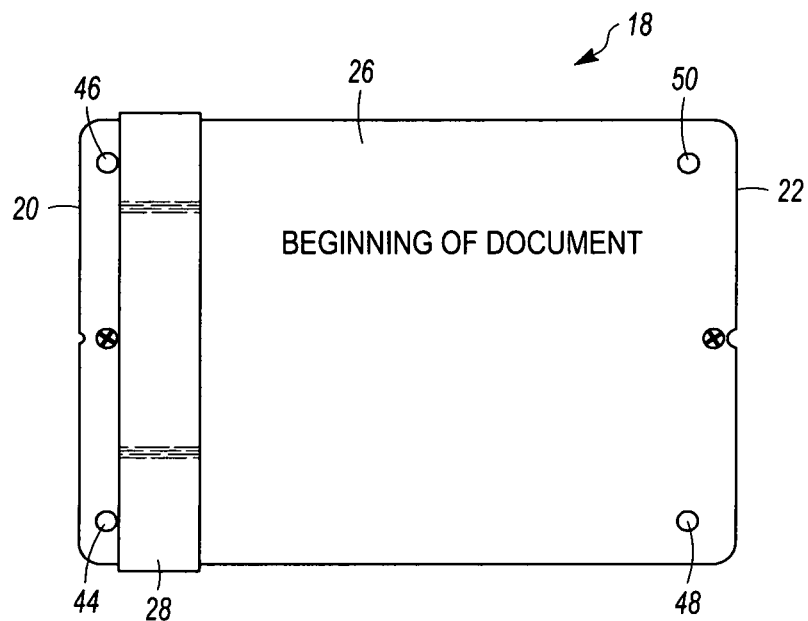
FIGS. 4A and 4B are bottom views of the board of the scanner assembly.
Figure 4B:
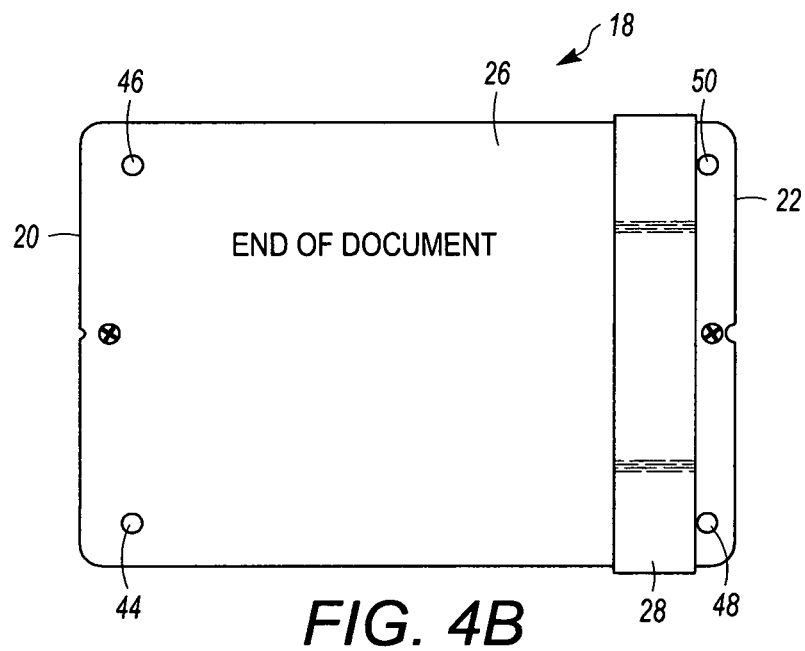

Also shown in FIG. 3A, the board 18 may include a plurality of protrusions 44, 46, 48, 50 that extend from the first face 24 to the second face 26 of the board 18. The protrusions 44, 46, 48, 50 are arranged such that two protrusions 44, 46 are disposed adjacent to the first end 20 and two protrusions 48, 50 are disposed adjacent the second end 22. As shown in FIGS. 4A and 4B, the protrusions 44, 46, 48, 50 limit movement of the cradle assembly 28 between the first end 20 and the second end 22. In this way, the protrusions 44, 46, 48, 50 provide a starting point and an ending point for the movement of the cradle assembly 28, which correspond to a top and a bottom of a document to be scanned.

For example, in FIG. 4A, the cradle assembly 28 and the scanner 30 are located at the starting point and the scanner 30 is positioned to begin scanning a document placed on the first face 24 of the board 18. Accordingly, the cradle assembly 28 contacts the protrusions 44, 46 and is adjacent to the first end 20. In FIG. 4B, the cradle assembly 28 and scanner 30 are located at the ending point and the scanner 30 has scanned a document placed on the first face 24 of the board 18. Accordingly, the cradle assembly 28 contacts the protrusions 48, 50 and is adjacent to the second end 22.

In other instances, the board 18 may include a greater or lesser number of protrusions. Furthermore, while the protrusions 44, 46, 48, 50 extend from the first face 24 to the second face 26, in other instances, the board may include separate and aligned protrusions on the first face 24 and the second face 24. Additionally, the protrusions may be arranged in any suitable fashion to limit movement of the cradle assembly 28 while allowing the scanner 30 to scan a document placed on the board 18.

Figure 5A:
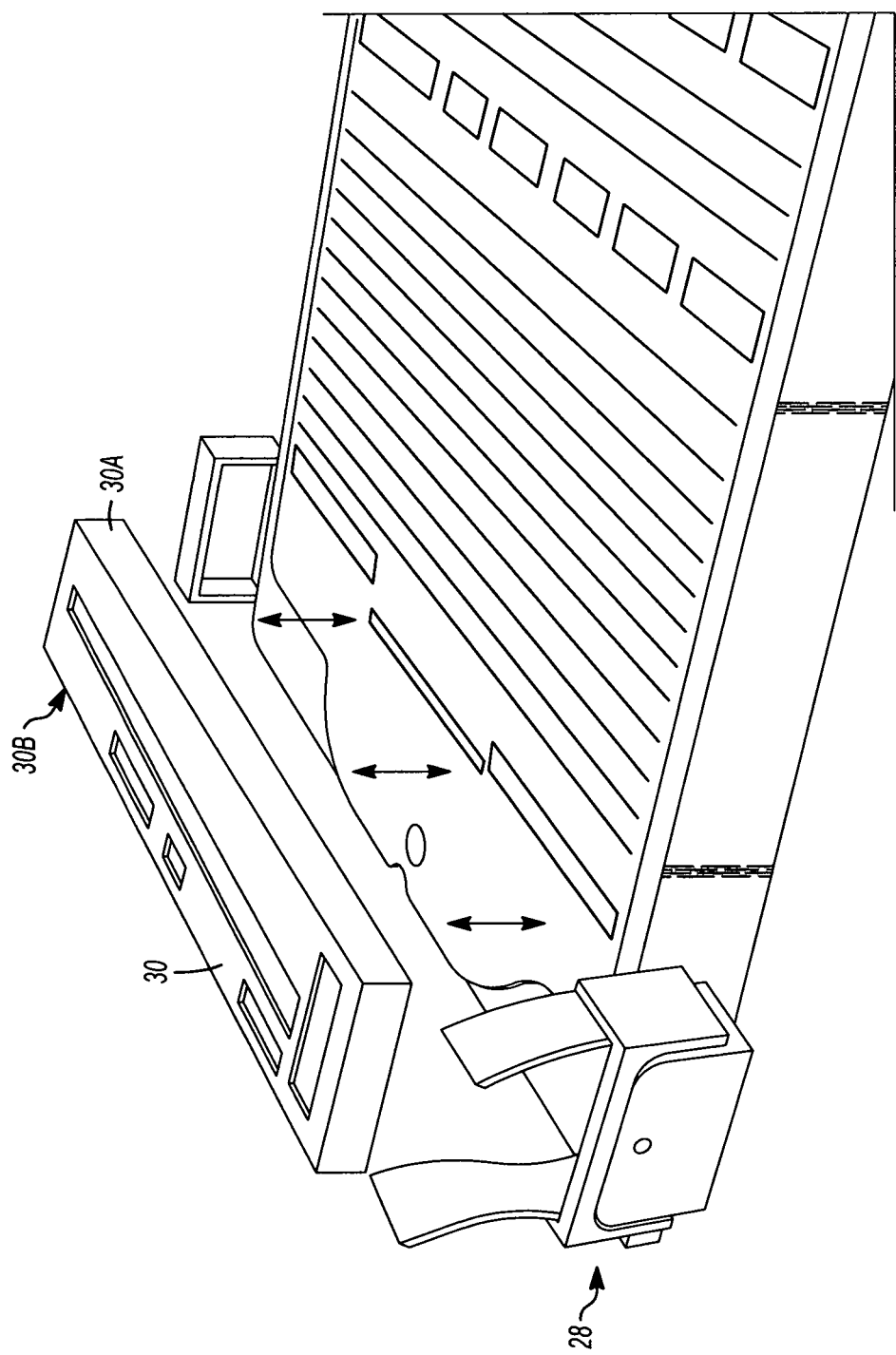
FIGS. 5A and 5B are perspective views of a scanner removed from a cradle assembly of the scanner assembly.

The cradle assembly 28 is further shown in FIG. 5A. As shown, the scanner 30 may be removed from the cradle assembly 28 and the cradle assembly 28 is configured to receive the scanner 30. It should be noted that, the scanner 30 may be any handheld scanner suitable for scanning documents. Accordingly, the cradle assembly 28 and components thereof may be of any suitable size to receive the scanner 30.

Figure 5B:
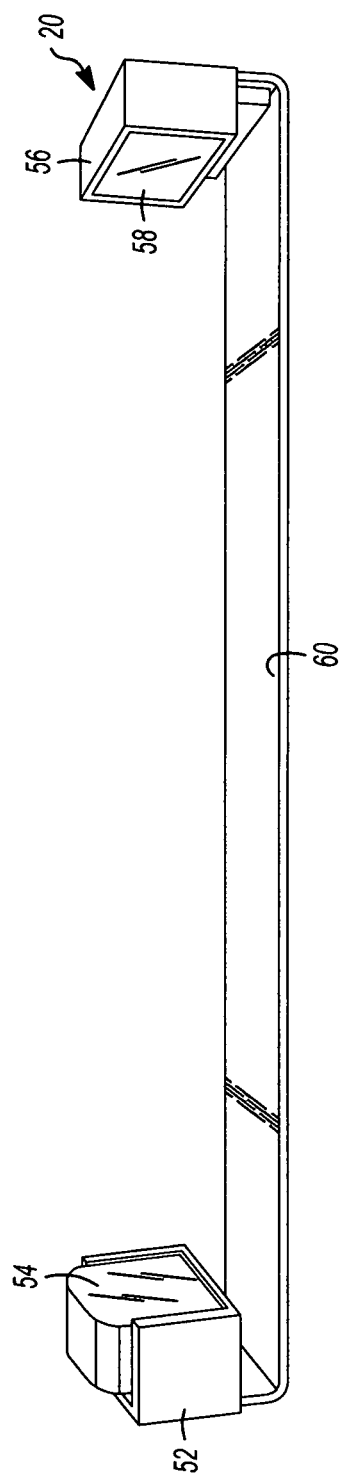

FIG. 5B illustrates components of the cradle assembly 28. As shown, the cradle assembly 28 may include a first cradle member 52 defining a pocket 54 configured to receive the scanner 30. The cradle assembly 28 also includes a second cradle member 56 defining a pocket 58 configured to receive the scanner 30. The second cradle member 56 is spaced from the first cradle member 52. The cradle assembly 28 also includes a support bracket 60 disposed between and coupled to the first and second cradle members 52, 56. In the instance of FIG. 5A, the cradle assembly 28 contacts the second face 26 of the board 18 while the first and second cradle member 52, 56 are disposed above the first face 24 of the board 18. The first and second cradle members 52, 56 and the support bracket 60 of the cradle assembly 28 are movable along the board 18 between the first and second ends 20, 22 for allowing the scanner 30 to scan documents on the first face 24 of the board 18.

Figure 5C:
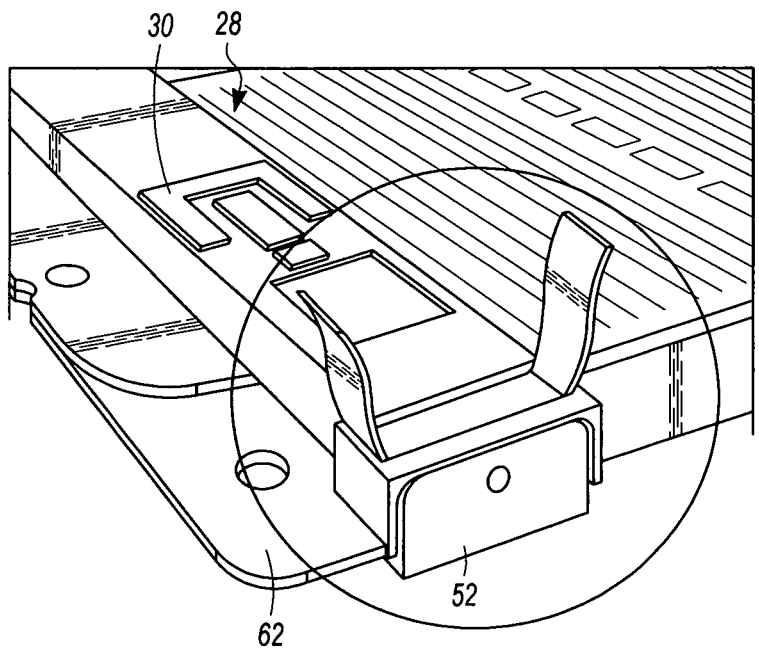
FIGS. 5C and 5D are partial views of the cradle assembly receiving the scanner.
Figure 5D:
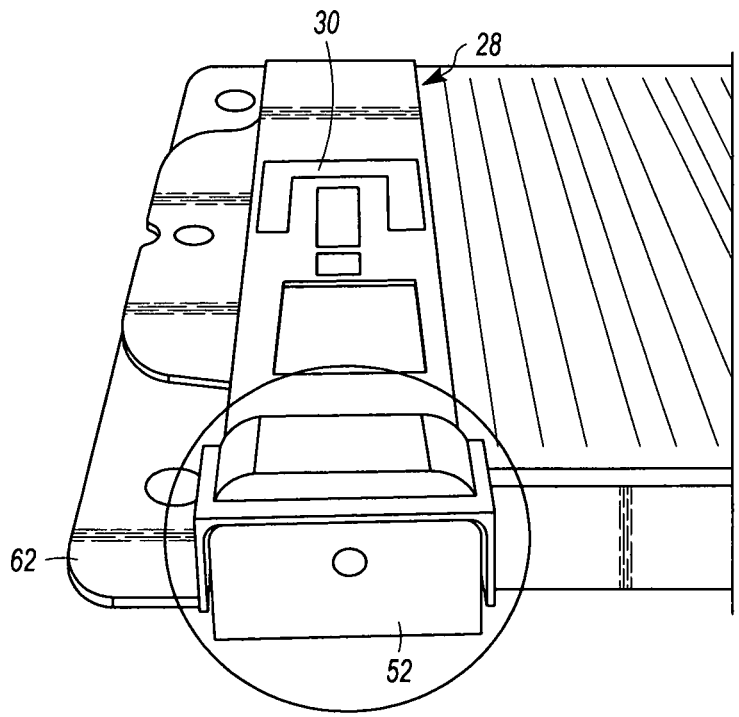

A lock assembly 62 of the cradle assembly 28 is shown in FIGS. 5C and 5D. The lock assembly 62 may be coupled to the first cradle member 52 and movable between a first position, shown in FIG. 5C, and a second position, shown in FIG. 5D. In the first position of FIG. 5C, the scanner 30 is fixed to the first and second cradle members 52, 56 and in the second position of FIG. 5D, the scanner 30 is removable from the first and second cradle members 52, 56.

In the instance of FIGS. 5C and 5D, the lock assembly 62 is a hook and loop fastener assembly. However, in other instances, the lock assembly 62 may be any suitable assembly for fixing the scanner 30 to the first and second cradle members 52. 56. Additionally, while the lock assembly 62 is coupled to the first cradle member 52 in FIGS. 5C and 5D, the lock assembly 62 may instead be coupled to the second cradle member 52. In some instances, the cradle assembly 28 may include a lock assembly 62 coupled to the first and second cradle members 52, 56.

The cradle assembly 28 may be coupled to a tension assembly 64, as shown in FIGS. 5E and 5F. The tension assembly 64 may be configured to adjust tension between the cradle assembly 28 and the board 18 (not shown in FIG. 5E or FIG. 5F).

Figure 5G:
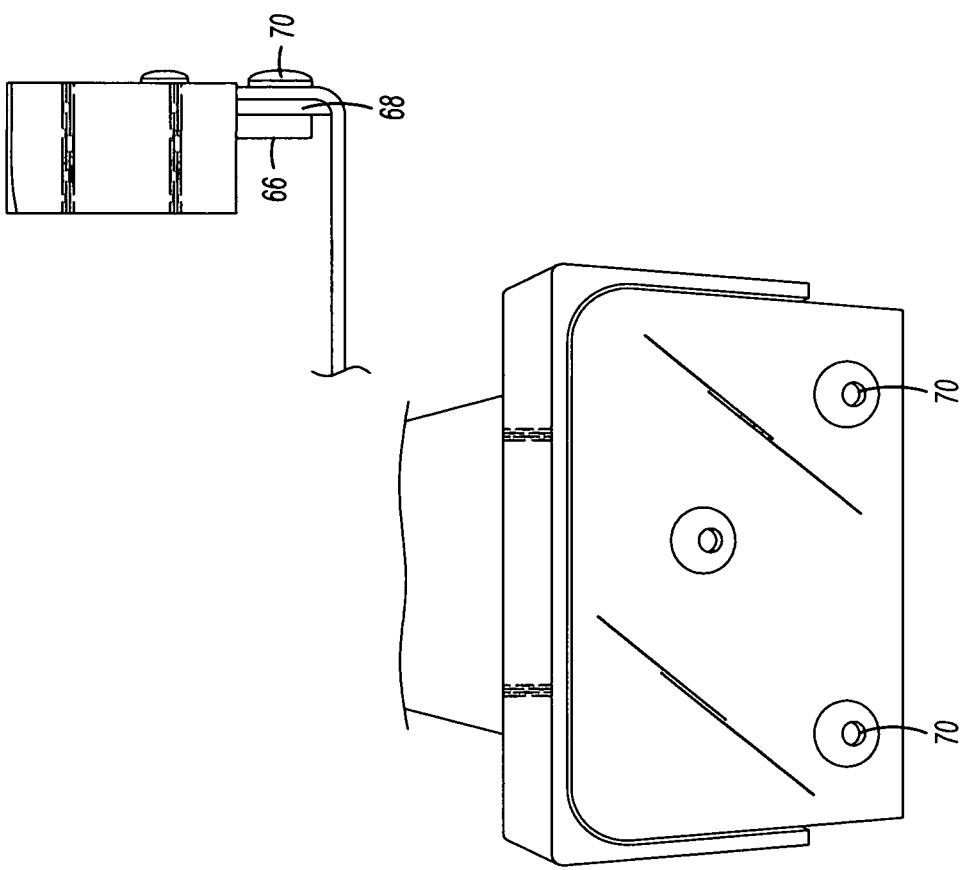

Components of the tension assembly 64 are illustrated in FIG. 5G. As shown, the tension assembly 64 may include an engaging member 66 coupled to the first cradle member 52 and/or the second cradle member 56 and abutting the board 18 (not shown in FIG. 5G). The tension assembly 64 also includes a resilient member 68 disposed between the engaging member 66 and the first and/or second cradle member 52, 56. The tension assembly 64 also includes a tension adjuster 70 configured to adjust tension between the engaging member 66 and the board 18.

In the instance of FIG. 5E, the engaging member 66 is coupled to the second cradle member 56. However, in other instances, the engaging member 66 may be couple to only the first cradle member 56 or both the first and second cradle members 52, 56.

The engaging member 66 is configured to reduce friction between the board 18 and the first cradle member 52 and/or the second cradle member 56. As such, the engaging member 66 may include any material suitable for reducing friction. For example, in FIG. 5G, the engaging member 66 includes a metal material. The engaging member 66 may also include a low-friction coating. For example, in FIG. 5H, an alternative instance of the tension assembly 64 is shown, where the engaging member 66 includes a first member 66A and a low-friction laminate 66B coupled to the first member 66A.

The tension assembly 64 also includes a resilient member 68 disposed between the engaging member 66 and the first and/or second cradle member 52, 56. The resilient member 68 may be configured to compress based on the tension adjuster 70 adjusting the tension between the engaging member 66 and the board 18. For example, in an instance where the tension adjuster 70 increases the tension between the engaging member 66 and the board 18, the resilient member 68 expands. In an instance where the tension adjuster 70 decreases the tension between the engaging member 66 and the board 18, the resilient member 68 compresses. As such, the resilient member 68 may include any suitable compressible material. For example, in FIG. 5G, the resilient member 68 includes a foam material.

Figure 5H:
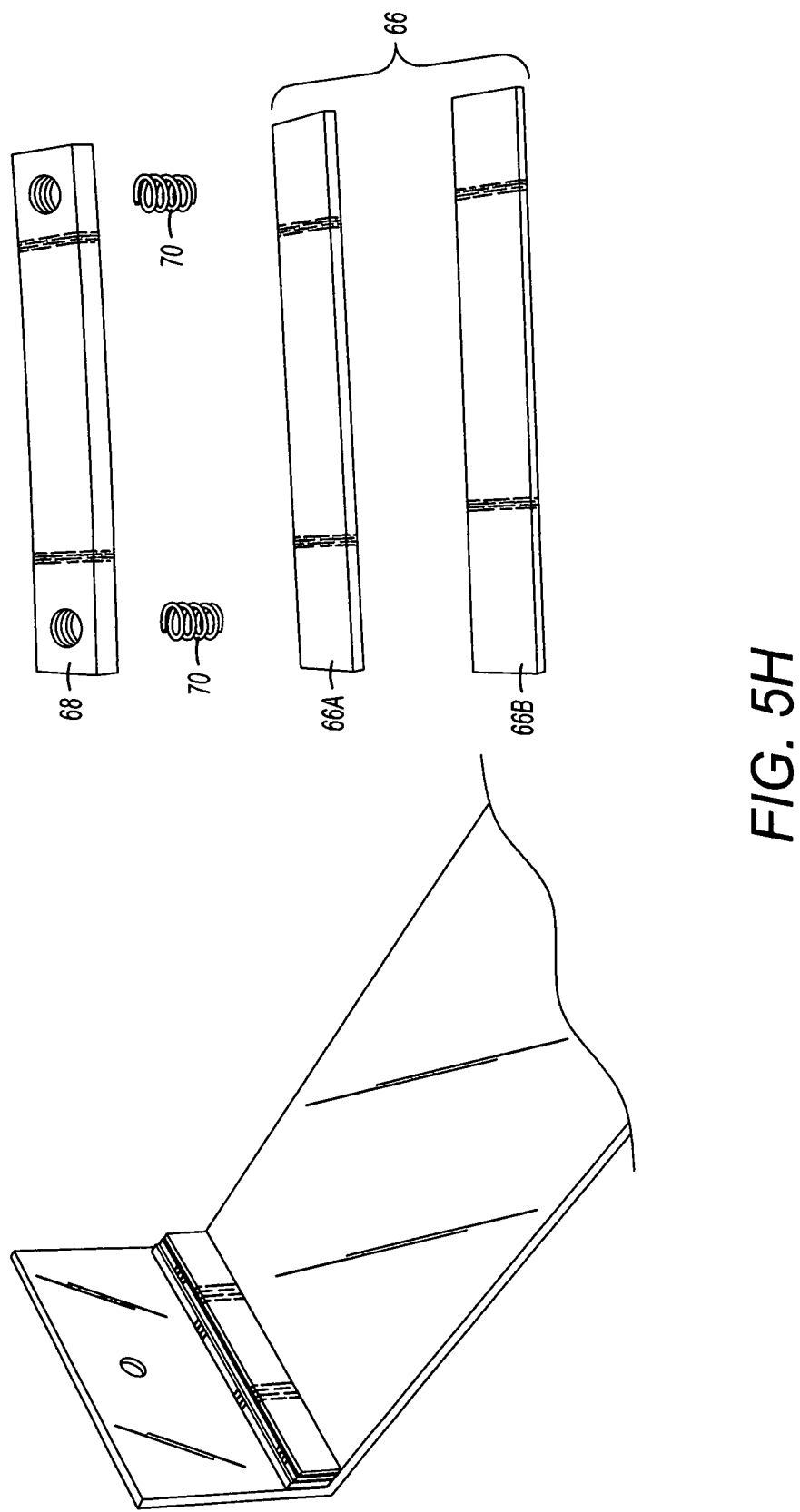
FIG. 5H is an exploded view of an alternative tension assembly.

As previously stated, the tension adjuster 70 is configured to adjust tension between the engaging member 66 and the board 18. The tension adjuster 70 may include any suitable components for adjusting tension between the engaging member 66 and the board 18. In FIG. 5G, the tension adjuster 70 includes screws that may be manually tightened to adjust tension between the engaging member 66 and the board 18. In FIG. 5H, the tension adjuster 70 includes springs that automatically adjust tension between the engaging member 66 and the board 18.

The cradle assembly 28 may be moved between the first end 20 to the second end 22 of the board 18 using a variety of methods. In some instances, the cradle assembly 28 may be manually moved between the first end 20 and the second end 22 by a user of the scanner assembly. In other instances, such as the instance of FIG. 6A, the scanner assembly 10 may include an adjustable support 72 configured to create a slope between the first end 20 and the second end 22 such that the cradle assembly 28 moves automatically between the first end 20 and the second end 22.

As shown in FIG. 6B, the adjustable support 72 includes a contacting member 74 that contacts the board 18 and a frictional member 76 that contacts a surface (not shown in FIG. 6A or FIG. 6B). The adjustable support 72 also includes a screw 78 and a rotatable member 80 configured to rotate about the screw 74 to adjust a distance between the contacting member 74 and the frictional member 76. The greater the distance between the contacting member 74 and the frictional member 76, the faster the cradle assembly 28 moves by force of gravity between the first end 20 and the second end 22. The smaller the distance between the contacting member 74 and the frictional member 76, the slower the cradle assembly 28 moves by force of gravity between the first end 20 and the second end 22.

In some instances, the adjustable support 72 may be coupled to the board 18. In other instances, the contacting member 74 may contact the board 18 without coupling to the board 18. In such instances, the contacting member 74 may include a frictional material, such as hook and loop fastener, rubber, or other quick-disconnect system. Similarly, the frictional member 76 that contacts a surface may include a frictional material, such as rubber.

Figure 7A:
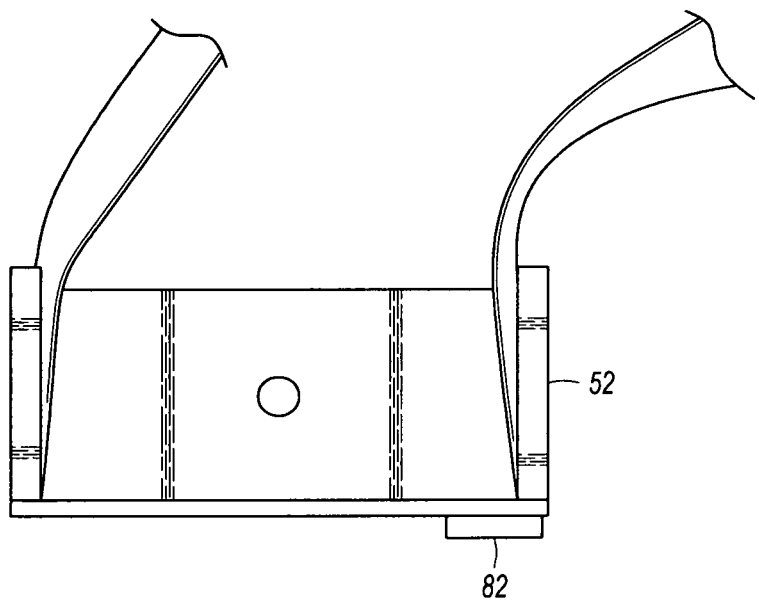
FIGS. 7A and 7B are perspective views of a spacer coupled to the cradle assembly.
Figure 7B:
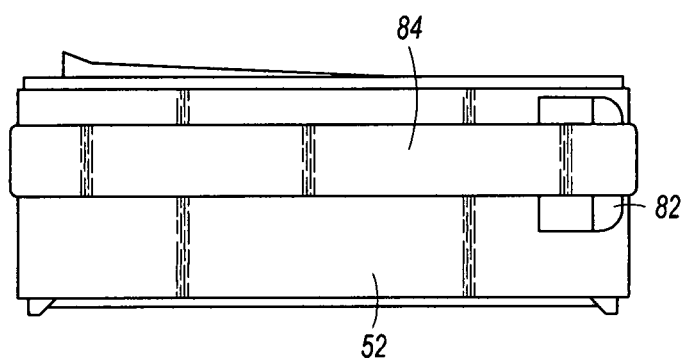

As shown in FIGS. 7A and 7B, a spacer 82 may be coupled to the cradle assembly 28. The spacer 82 is coupled to the second region 30B of the scanner 30 and tilts the scanner 30 toward the second end 22 of the board 18 such that a first region 30A of the scanner 30 is lower than a second region 30B of the scanner (the first and second regions 30A, 30B are shown in FIG. 5A). In this way, the first region 30A of the scanner 30 maintains contact with the document holder 19. Additionally, some components of the scanner 30 may scratch the document holder 19. Specifically, in some scanners 30, components of the scanner 30 near the second region 30B may scratch the document holder 19. In this way, the spacer 82 contacts the document holder 19, such that the second region 30B does not contact the document holder 19 and does not scratch the document holder 19.

The spacer 82 may be of any suitable size to allow the cradle assembly 28 to move between the first end 20 and the second end 22 of the board 18. For example, the height of the spacer 82 may be between 0.1 and 0.5 inches. Additionally, in FIG. 7A, the spacer 82 is coupled to the first cradle member 52. In other instances, the spacer 82 may be coupled to the second cradle member 56 or to both the first and second cradle members 52, 56. Furthermore, as shown in FIG. 7B, the spacer 82 may be coupled to the first cradle member 52 using an adhesive 84. For example, in FIG. 7B, the adhesive 84 includes polytetrafluoroethylene (PTFE) tape with a low coefficient of friction, which provides a smooth surface.

Figure 8:
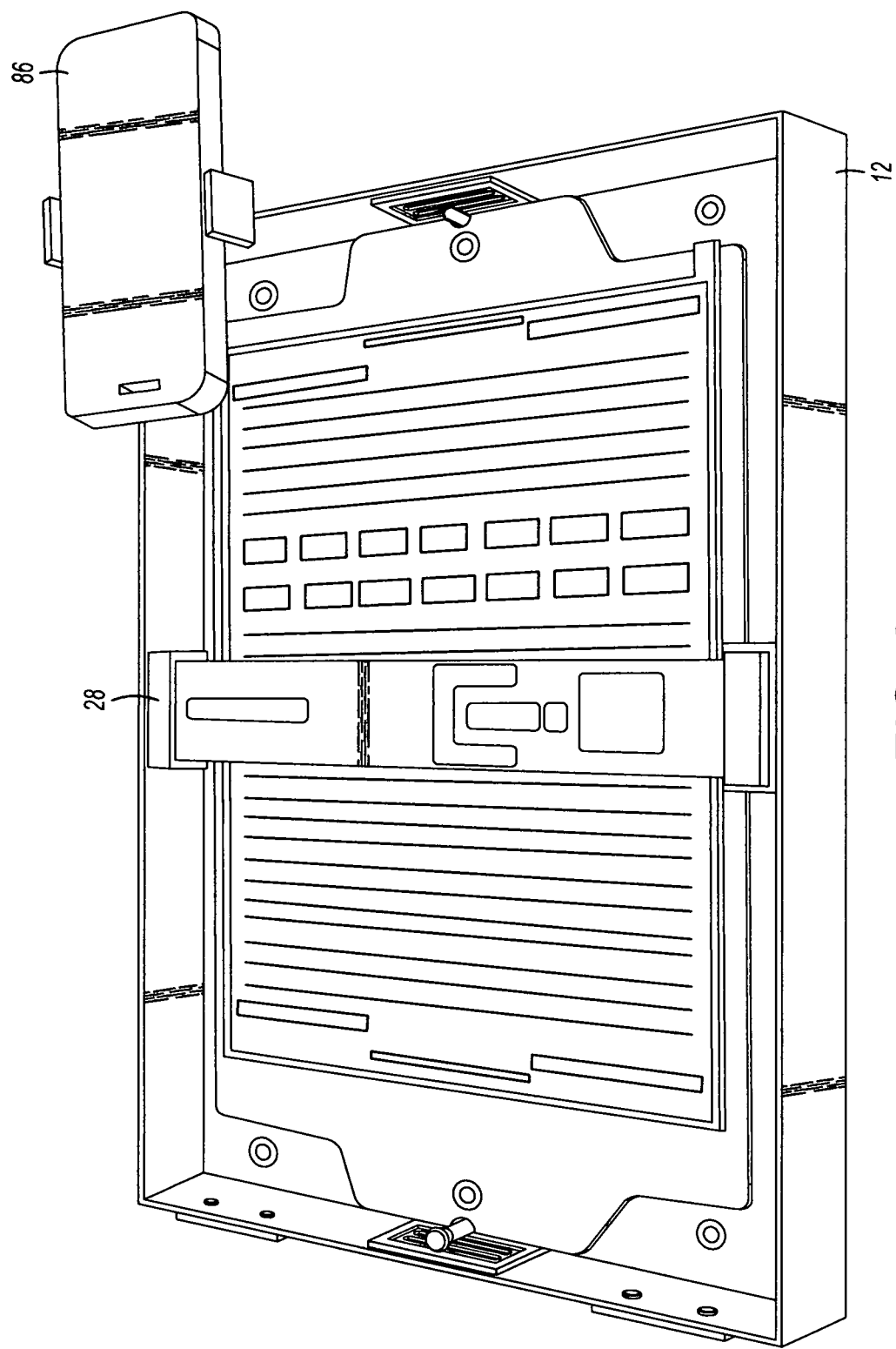
FIG. 8 is a perspective view of a cellphone holder coupled to the scanner assembly.
Figure 9:
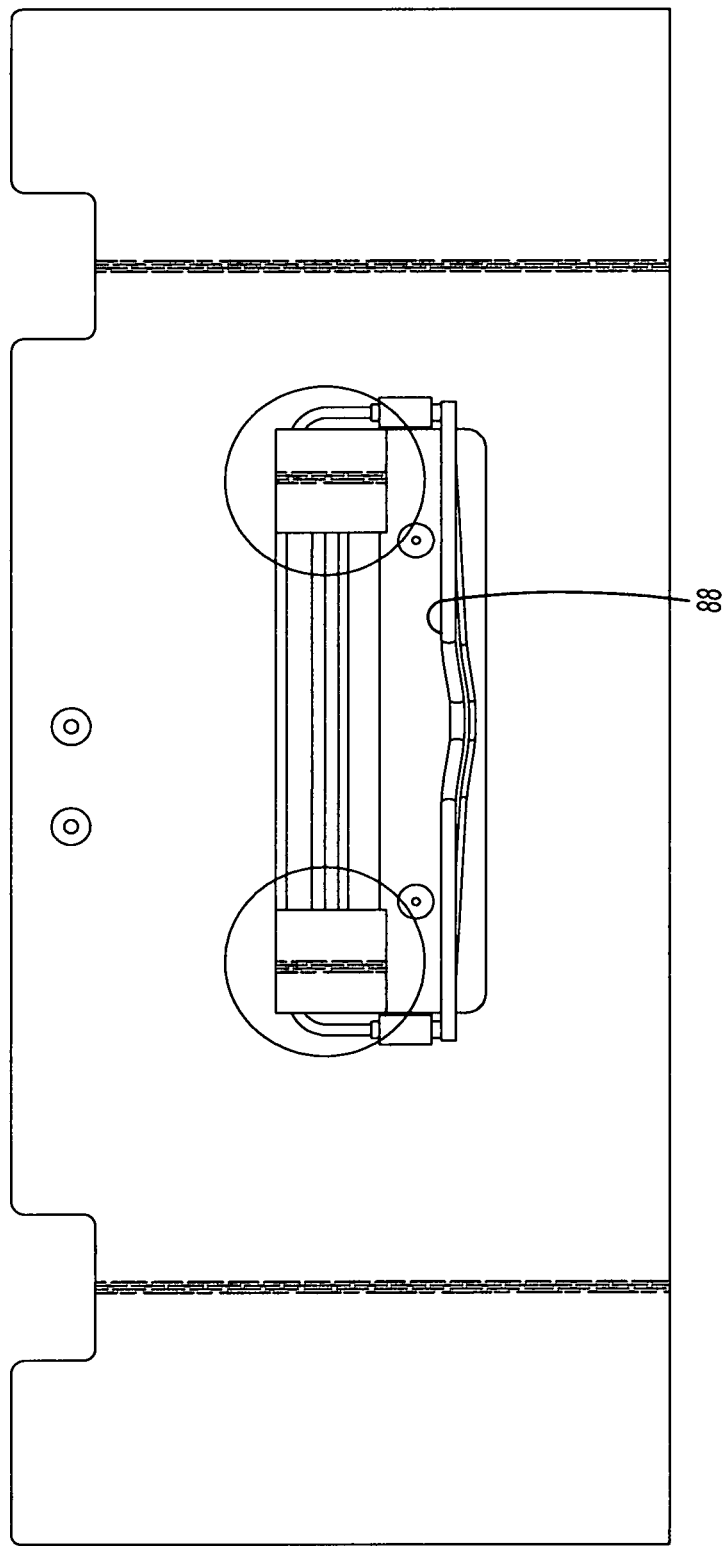
FIG. 9 is a partial view of a clip coupled to a lid of the scanner assembly.

FIGS. 8-10B illustrate other components that may be included in the scanner assembly 10. As shown in FIG. 8, the scanner assembly 10 may include a cellphone holder 86, which may be coupled to the base 12. As shown in FIG. 9, a clip 88 for holding documents may be coupled to the lid 16 of the scanner assembly 10. As shown in FIGS. 10A and 10B, the scanner assembly 10 may include an insert 90 configured to store documents, such as a writing pad 92.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A scanner assembly for portably scanning documents, said scanner assembly comprising:
   a board extending from a first end to a second end and having a first face and a second face opposite said first face;
   a cradle assembly comprising,
   a first cradle member coupled to said board and defining a pocket configured to receive a scanner,
   a second cradle member coupled to said board and spaced from said first cradle member, with said second cradle member configured to receive the scanner, and
   a support bracket disposed between and coupled to said first and second cradle members; and
   a lock assembly coupled to said first cradle member and movable between a first position where the scanner is fixed to said first and second cradle members and a second position where the scanner is removable from the first and second cradle members;
   wherein said first and second cradle members and said support bracket of said cradle assembly are movable along said board between said first and second ends for allowing the scanner to scan documents on said first face of said board.

2. The scanner assembly as set forth in claim 1 further comprising a tension assembly coupled to said cradle assembly and configured to adjust tension between said cradle assembly and said board.

3. The scanner assembly as set forth in claim 2, wherein said tension assembly comprises an engaging member coupled to at least one of said first and second cradle members and abutting said board, with said engaging member configured to reduce friction between said board and said at least one of said first and second cradle members of said cradle assembly.

4. The scanner assembly as set forth in claim 3, wherein said tension assembly comprises a resilient member disposed between said engaging member and said at least one of said first and second cradle members of said cradle assembly.

5. The scanner assembly as set forth in claim 4, wherein said tension assembly further comprises a tension adjuster configured to adjust tension between said engaging member and said board.

6. The scanner assembly as set forth in claim 1, wherein said board further includes a document holder on said first face configured to retain documents for scanning.

7. The scanner assembly as set forth in claim 1, wherein said pocket is further defined as a first pocket, and wherein said second cradle member defines a second pocket configured to receive the scanner.

8. A scanner assembly for portably scanning documents, said scanner assembly comprising:
- a board extending from a first end to a second end and having a first face and a second face opposite said first face;
- a cradle assembly comprising,
- a first cradle member coupled to said board and defining a pocket configured to receive a scanner,
- a second cradle member coupled to said board and spaced from said first cradle member, with said second cradle member configured to receive the scanner, and
- a support bracket disposed between and coupled to said first and second cradle members; and
- a tension assembly coupled to said cradle assembly and configured to adjust tension between said cradle assembly and said board;
- wherein said first and second cradle members and said support bracket of said cradle assembly are movable along said board between said first and second ends for allowing the scanner to scan documents on said first face of said board.

9. The scanner assembly as set forth in claim 8, wherein said tension assembly comprises,
- an engaging member coupled to at least one of said first and second cradle members and abutting said board, with said engaging member configured to reduce friction between said board and said at least one of said first and second cradle members of said cradle assembly,
- a resilient member disposed between said engaging member and said at least one of said first and second cradle members of said cradle assembly, and
- a tension adjuster configured to adjust tension between said engaging member and said board.

10. The scanner assembly as set forth in claim 8, wherein said board further includes a document holder on said first face configured to retain documents for scanning.

11. The scanner assembly as set forth in claim 8, wherein said pocket is further defined as a first pocket, and wherein said second cradle member defines a second pocket configured to receive the scanner.

12. The scanner assembly as set forth in claim 11 further comprising a lock assembly coupled to said first cradle member and movable between a first position where the scanner is fixed to said first and second cradle members and a second position where the scanner is removable from the first and second cradle members.

13. A scanner assembly for portably scanning documents, said scanner assembly comprising:
- a case comprising,
- a base defining an interior, and
- a lid configured to couple said base and movable between an open position where said lid is spaced from said base and a closed position where said lid is coupled to said base;
- a board disposable in said interior of said base, with said board extending from a first end to a second end and having a first face and a second face opposite said first face;
- a cradle assembly comprising,
- a first cradle member coupled to said board and defining a pocket configured to receive a scanner,
- a second cradle member coupled to said board and spaced from said first cradle member, with said second cradle member configured to receive the scanner, and
- a support bracket disposed between and coupled to said first and second cradle members;
- wherein said first and second cradle members and said support bracket of said cradle assembly are movable along said board between said first and second ends for allowing the scanner to scan documents on said first face of said board.

14. The scanner assembly as set forth in claim 13 further comprising a lock assembly coupled to said first cradle member and movable between a first position where the scanner is fixed to said first and second cradle members and a second position where the scanner is removable from the first and second cradle members.

15. The scanner assembly as set forth in claim 13 further comprising a tension assembly coupled to said cradle assembly and configured to adjust tension between said cradle assembly and said board.

16. The scanner assembly as set forth in claim 15, wherein said tension assembly comprises,
- an engaging member coupled to at least one of said first and second cradle members and abutting said board, with said engaging member configured to reduce friction between said board and said at least one of said first and second cradle members of said cradle assembly,
- a resilient member disposed between said engaging member and said at least one of said first and second cradle members of said cradle assembly, and
- a tension adjuster configured to adjust tension between said engaging member and said board.

17. The scanner assembly as set forth in claim 13, wherein one of said board and said case comprises a locating projection, and wherein the other of said board and said case defines a locating recess configured to receive said locating projection for positioning said board relative to said base.

18. The scanner assembly as set forth in claim 17, wherein said case comprises said locating projection, and wherein said board defines said locating recess.

19. The scanner assembly as set forth in claim 13, wherein said board further includes a document holder on said first face configured to retain documents for scanning.

20. The scanner assembly as set forth in claim 13, wherein said pocket is further defined as a first pocket, and wherein said second cradle member defines a second pocket configured to receive the scanner.

* * * * *